(No Model.)
J. H. EICKERSHOFF & J. & H. KNOST.
EDUCATIONAL APPLIANCE.
No. 474,773. Patented May 10, 1892.
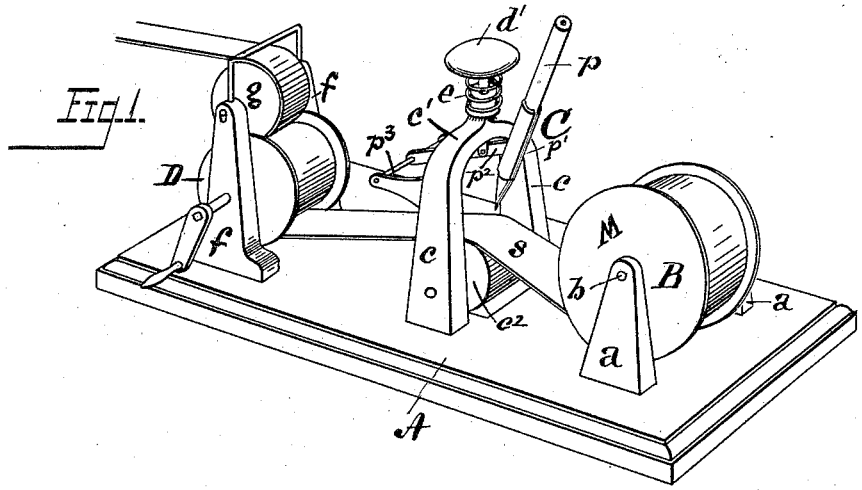
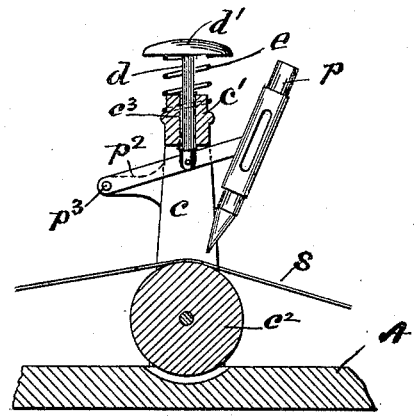
Witnesses:
W. C. Jirdinston
E. Hosea.
Inventors:
John H. Eickershoff
Julius Knost
Hermann Knost
by L. M. Hosea
Attorney.

UNITED STATES PATENT OFFICE.

JOHN H. EICKERSHOFF, JULIUS KNOST, AND HERMANN KNOST, OF CINCINNATI, OHIO.

EDUCATIONAL APPLIANCE.

SPECIFICATION forming part of Letters Patent No. 474,773, dated May 10, 1892.

Application filed January 11, 1892. Serial No. 417,639. (No model.)

*To all whom it may concern:*

Be it known that we, JOHN H. EICKERSHOFF, JULIUS KNOST, and HERMANN KNOST, citizens of the United States, residing at Cincinnati, Ohio, have invented new and useful Improvements in Recording-Instruments or Educational Appliances, of which the following is a specification.

Our invention relates to educational appliances and is designed to assist in teaching the art of telegraphy by providing a simple and inexpensive instrument by which the characteristic marks of the "Morse alphabet" are produced upon a paper strip by a marking-pencil and simultaneously therewith the characteristic sounds of the ordinary "sounder." There is in the operation of the instrument thus presented both to the eye and the ear the "dots and dashes" of the Morse alphabet in such relation that the education of both organs progress together to their mutual benefit and conducing to the more speedy and thorough acquiring of the art. In the case of children the use of the instrument may be made an interesting pastime, the effect of each manipulating impulse being conveyed to the ear and to the eye simultaneously, so that errors are at once detected and correct impressions upon the memory deepened and facilitated.

To this end our invention consists, primarily, in an instrument adapted to be manipulated as an ordinary sounding-key, provided with a paper strip, feeding mechanism, and marking-pencil, combined and arranged to produce the results above described.

It consists, secondarily, in a form of mechanism herein more fully described and shown, wherein these results are obtained by a very simple and inexpensive toy instrument adapted to the use of children or to beginners in the art.

As many mechanical modifications may be produced to accomplish substantially the same or similar results, we confine the illustration of the invention to the instrument last referred to as conveniently embodying the general principle.

Figure 1 is a general side elevation of the device in perspective; and Fig. 2, a detail section of the manipulating-head and connections, showing the pencil and carrier and mode of operating the same in relation to the platen-roll.

Referring now more particularly to the drawings, the instrument is shown as consisting of three main features mounted upon a common base A, of which B designates a containing-roll and carrying a paper strip $s$, C a stand carrying the "key" and platen-roll, and D a feed-roll, all as hereinafter more fully described.

The containing-roll B is an ordinary paper-reel, mounted between side standards $a$ upon an axial stem or bolt $b$, projecting through the standards $a$, provided with a head at one end and a thumb-nut at the other. By setting up the nut the standards $a$ are forced together (being sufficiently elastic for the purpose) against the ends of the reel to produce the required friction to prevent overrunning in feeding out the paper strip $s$.

The central stand C consists of standards $c$, joined across the top by a vertically-perforated socket-piece $C'$. Between the standards, near the bottom, is journaled a platen-roll $c^2$, preferably having a hard and smooth peripheral surface (as a lining of metal, hard rubber, &c.) and guide-flanges. The paper strip $s$ is fed across the platen-roll from the reel M to the feed-roll D, and in passing receives the marks of a marking-pencil $p$, mounted and controlled as follows: The pencil $p$ is carried in a frictional holding-socket $p'$, carried at the end of a lever-arm $p^2$, pivoted to a pivot-stem $p^3$, inserted between and through the standards $c$. The lever-arm $p^2$ is pivotally connected to a vertical stem $d$, passing upward through the socket-piece $c'$. The stem is provided with a large button-head $d'$ and is normally upheld by a spiral spring $e$, surrounding the stem below the head $d'$ and above the socket-piece $c'$, thus also upholding the pencil $p$ from the paper strip. Upon pressing down the head $d'$ against the force of the spring $e$ to the limit of its movement the pencil is forced down upon the paper upon the platen-roll. The head $d'$ and connected parts constitute the sounder, to which end and to secure an easy and perfectly-guided reciprocation of the stem $d$ we line the aperture of the socket-piece $C'$ with a section of metallic tubing $c^3$, whose upset ends, projecting slightly beyond the socket-piece *c'* above and below, receive the impact of the head *d'* at its downward movement and of an enlargement at the lower end of the stem in its upward movement, these reproducing the "click" of the ordinary sounder-armature. This sound is enhanced by the formation of the standards *c* and connecting socket-piece *c'* of hard wood, (such as maple,) by which the sound is reinforced by the base A, which is preferably of hard wood and hollow beneath.

The feed-roll mechanism is as follows: Between two upright standards *f f* is journaled a roller or drum D, preferably having thereon a peripheral lining of india-rubber. Above the roll D and journaled in vertical slots of the standards *f* is a weighted idler-roll *g*. The paper strip from the supply-reel passes over the platen-roll, under the feed-roll D, upward around the rear of the same, and beneath the weight-roll *g*.

Power may be applied to the roll D by a weight or spring in the usual manner to produce a uniform feed. In the drawings a crank *x* is shown applied to the shaft of the roll D, whereby the desired rotation may be given by hand; but it is to be understood that any of the many well-known forms of driving mechanism may be applied to give a continuous uniform feed.

The operation of the device is as follows: The paper strip being set in motion, the head *d'* is depressed, bringing the point of the pencil *p* in contact with the paper. It is held down a longer or shorter time to produce dashes and dots of the Morse alphabet, and by the force of depression and the resiliency of the spring *e* upon release the characteristic clicks of the ordinary telegraph-instruments are reproduced simultaneously with the marking.

It will be readily understood that the form of mechanism here exhibited for simultaneously marking upon a paper and giving the characteristic corresponding sounds of telegraphic instruments in use in sending or receiving messages may be varied within the resources of mechanical art.

We claim as our invention and desire to secure by Letters Patent of the United States—

1. An educational appliance embodying, substantially, a paper strip, feeding mechanism for the same, a marking-pencil, mechanism for carrying the pencil and enabling it to be impressed by the hand of the operator against the paper strip, and striking abutments limiting the operation of the pencil, whereby the manipulations of the pencil produce successive lines and dots upon the paper and simultaneously reproduce to the ear the characteristic sounds of telegraphic instruments corresponding with the marks upon the paper, substantially as and for the purpose set forth.

2. In an educational appliance of the character indicated, the combination, on a suitable base-frame, of a paper-reel carrying a paper strip, a marking table or roll, a feed-roll provided with winding mechanism, a pencil-carrier and pencil, and means, substantially as described, for operating the pencil-carrier by hand to impress the pencil against the paper roll upon the marking table or roll at proper intervals to produce dashes and dots thereon and for indicating the beginning and ending of the dashes and dots by sound, substantially as set forth.

In testimony whereof we have hereunto set our hands in the presence of two subscribing witnesses.

JOHN H. EICKERSHOFF.
JULIUS KNOST.
HERMANN KNOST.

Witnesses:
L. M. HOSEA,
E. HOSEA.